United States Patent
Kokeguchi et al.

(10) Patent No.: US 9,001,418 B2
(45) Date of Patent: Apr. 7, 2015

(54) NEAR-INFRARED REFLECTING FILM AND NEAR-INFRARED REFLECTING BODY PROVIDED WITH SAME

(75) Inventors: Noriyuki Kokeguchi, Tokyo (JP); Takeo Arai, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 178 days.

(21) Appl. No.: 13/808,538

(22) PCT Filed: Jun. 23, 2011

(86) PCT No.: PCT/JP2011/064380
§ 371 (c)(1),
(2), (4) Date: Jan. 4, 2013

(87) PCT Pub. No.: WO2012/014607
PCT Pub. Date: Feb. 2, 2012

(65) Prior Publication Data
US 2013/0107355 A1    May 2, 2013

(30) Foreign Application Priority Data

Jul. 24, 2010    (JP) .................................. 2010-166593

(51) Int. Cl.
*F21V 9/04* (2006.01)
*F21V 9/06* (2006.01)
*G02B 5/08* (2006.01)
*G02B 5/20* (2006.01)

(52) U.S. Cl.
CPC .............. *G02B 5/0816* (2013.01); *G02B 5/208* (2013.01)

(58) Field of Classification Search
CPC ............ G02F 1/1335; G02B 5/30; B32B 7/02
USPC .............. 349/96; 359/488, 359; 428/195, 212
See application file for complete search history.

(56) References Cited

U.S. PATENT DOCUMENTS

| 7,760,424 B2 | 7/2010 | Takeuchi et al. | |
| 2003/0104175 A1* | 6/2003 | Koike et al. | 428/195 |
| 2010/0208349 A1 | 8/2010 | Beer et al. | |
| 2010/0253884 A1* | 10/2010 | Katou et al. | 349/96 |
| 2011/0033681 A1* | 2/2011 | Adachi et al. | 428/212 |

FOREIGN PATENT DOCUMENTS

| CN | 101501533 A | | 8/2009 |
| JP | 5-247354 Y | | 9/1993 |
| JP | 2000-266930 A | | 9/2000 |
| JP | 2004-122364 | | 4/2004 |
| JP | 2004-125822 Y | | 4/2004 |
| JP | 2008-003283 Y | | 1/2008 |
| JP | 2009-086659 | | 4/2009 |
| JP | 2009086659 A | * | 4/2009 |
| JP | 2009-544491 A | | 12/2009 |

OTHER PUBLICATIONS

The English translation of the Japanese document (JP 2009-086659).*
Chinese Office Action (receiving date: Jul. 29, 2014) and English translation thereof (total 21 pages).

* cited by examiner

*Primary Examiner* — Suchin Parihar
*Assistant Examiner* — Ephrem Mebrahtu
(74) *Attorney, Agent, or Firm* — Lucas & Mercanti, LLP

(57) ABSTRACT

The present invention provides a highly flexible near-infrared reflecting film which has achieved good near-infrared reflection characteristics by comprising layers that have different refractive indexes and which is not susceptible to bending or cracks. This near-infrared reflecting film has a multilayer film, in which films having refractive indexes different from each other are laminated, on a film, and is characterized in that: the difference of the refractive indexes between at least two adjacent layers is 0.3 or more; at least one of the two adjacent layers contains a metal oxide; and at least one of the two adjacent layers contains a polyvinyl alcohol or an inorganic polymer.

14 Claims, No Drawings

NEAR-INFRARED REFLECTING FILM AND NEAR-INFRARED REFLECTING BODY PROVIDED WITH SAME

CROSS REFERENCE TO RELATED APPLICATION

This Application is a 371 of PCT/JP2011/064380 filed on Jun. 23, 2011 which, in turn, claimed the priority of Japanese Patent Application No. 2010-166593 filed on Jul. 24, 2010, all applications are incorporated by reference herein.

TECHNICAL FIELD

The present invention relates to a near-infrared reflective film which enables a low cost and an area enlarging trend and is excellent in optical properties and film physical properties.

BACKGROUND ART

Energy-saving techniques attract attention in such a point that electric energy for operating an air conditioner is minimized by suppressing a temperature rise due to entrance of thermal radiation energy of sunlight into a room through window glasses.

Generally, a laminated film in which a high refractive index layer and a low refractive index layer are made to have an equal optical film thickness and laminated alternately has a characteristic to reflect selectively light rays with respective specific wavelengths. Accordingly, as heat ray shielding films used for windows and components for vehicles, laminated films with selectively-reflecting properties to transmit visible light rays and to reflect selectively near infrared rays are utilized on a trial basis.

Hitherto, according to some of the reported film production techniques, laminated films are produced by laminating multiple layers through dry type film production methods, such as vacuum deposition methods and sputtering methods. However, the dry type film production methods have disadvantages such as high production cost, difficulty in enlarging an area of a film, and limitation of usable substrates to a heat-resistant material.

On the other hand, wet-type film production methods such as liquid coating methods have advantages such as low production cost and relative easiness in enlarging an area of a film. However, in the case where a laminated layer is produced by the wet-type film production methods, if the number of layers is too many, the industrial production of the laminated layer becomes difficult from the viewpoints of cost and difficulty in enlarging of an area.

According to another aspect, a capability to produce a flexible substrate such as a film is one of large features of the wet-type film production methods.

Conventionally, a coating film containing titanium oxides with a particle size of 100 nm or less and an organic silane compound as main components is proposed.

Further, conventionally, each of a high refractive index layer and a low refractive index layer is made to contain inorganic oxides. For example, it has been known to form an organic-inorganic hybrid film with a composition containing titanium oxide fine particles, an organosilicon compound, and a multifunctional acrylic compound as main components.

However, in the case where such a film is formed specifically on a base film, flexibility becomes insufficient and bending deformation and cracks tend to occur. In particular, in the case where such a film is to form an optical film with a refractive index difference and a good optical performance, since the content of hard inorganic oxides required to control a refractive index is forced to be increased, it is difficult to obtain a flexible film.

For example, Patent Document 1 discloses a film member containing a binder composed of rutile type titanium oxide particles and an organosilicon compound and air, and Patent Document 2 discloses a heat ray shielding film including a high refractive index layer composed of a resin layer containing inorganic particles. As a result of the evaluation conducted for the above films in terms of flexibility as the effect of the present invention, it turned out that the physical properties as a laminated film are not sufficient. In addition, above patent documents do not disclose the constitutions of the present invention.

RELATED ART DOCUMENT

Patent Document
Patent document 1: Japanese Patent No. 4107037 official report
Patent document 2: Japanese Unexamined Patent Publication No. 2009-86659 official report

SUMMARY OF THE INVENTION

Problems To Be Solved By The Invention

An object of the present invention is to obtain a near-infrared reflective film which is composed of multiple layers different in refractive index, has good flexibility and near-infrared reflective characteristics with good performance, and is not likely to cause bending deformation and cracks.

Means For Solving The Problems

The present inventors found out that the flexibility is improved by making a film itself contain water and by constituting respective additives so as to form a network with a hydrogen bond of OH.

The above object of the present invention can be attained by the following constitutions.

1. A near-infrared reflective film that includes multilayer films which are laminated on a film and different in refractive index from each other, is characterized in that a refractive index difference between at least two neighboring layers is 0.3 or more, at least one layer of the two neighboring layers contains a metal oxide, and at least one layer of the two neighboring layers contains a polyvinyl alcohol or an inorganic polymer.
2. The near-infrared film described in the item 1 is characterized in that the metal oxide is a titanium dioxide.
3. The near-infrared reflective film described in the item 1 is characterized in that the metal oxide is a silicon dioxide.
4. The near-infrared reflective film described in the item 1 is characterized in that at least one layer of the at least two neighboring layers contains a hardening agent together with a polyvinyl alcohol.
4. The near-infrared reflective film described in any one of the items 1 to 3 is characterized in that the polyvinyl alcohol is hardened by a hardening agent.
5. The near-infrared reflective film described in the item 1 is characterized in that the hardening agent is borate.
6. A near-infrared reflector is characterized in that the near-infrared reflective film described in any one of the items 1 to 5 is provided on at least one surface of a substrate.
7. An optical film is characterized in that in a near-infrared reflective film that includes multilayer films which are laminated on a film and different in refractive index from each other, a refractive index difference between at least two neighboring layers is 0.3 or more, at least one layer of the two neighboring layers contains a metal oxide, and at least one layer of the two neighboring layers contains a polyvinyl alcohol or an inorganic polymer.

Effect Of The Invention

According to the present invention, it becomes possible to obtain a near-infrared reflective film with a flexibility improved by making a film itself, constituting a reflective film, contain water and by constituting respective constitutional elements so as to form a network with a hydrogen bond of OH, and to obtain a near-infrared reflector provided with the near-infrared reflective film.

Embodiment For Carrying Out The Invention

Hereafter, the best embodiments for carrying out the present invention will be explained in detail.

[Near-Infrared Reflective Film]

A near-infrared reflective film according to the present invention includes multiple layers which are different in refractive index from each other and laminated on a polymer film, and has a visible light transmissivity, specified in JIS R3106-1998, of 50% or more and a region with a reflectance of 40% or more for a wavelength region of 900 nm to 1400 nm.

As a film substrate (support) usable in the present invention, various resin films may be used. Examples of the resin films include: polyolefin films (polyethylene, polypropylene, etc.), polyester films (polyethylene terephthalte, polyethylenenaphthalate, etc.), polyvinyl chloride, and cellulose triacetate. Of these, polyester film is preferable. The polyester film (hereafter, merely referred to as polyester) is not specifically limited to. However, the polyesters have preferable a film forming ability which makes a dicarboxylic acid component and a diol component as main constitutional components. Examples of the dicarboxylic acid component of the main constitutional components include: terephthalic acid, isophthalic acid, phthalic acid, 2,6-naphthalene dicarboxylic acid, 2,7-naphthalene dicarboxylic acid, diphenylsulfone dicarboxylic acid, diphenyl ether dicarboxylic acid, diphenylethanedicarboxylic acid, cyclohexanedicarboxylic acid, diphenyldicarboxylic acid, diphenylthioether dicarboxylic acid, diphenyl ketone dicarboxylic acid, and phenylindan dicarboxylic acid. Further, examples of the diol component include: ethylene glycol, propylene glycol, tetramethylene glycol, a cyclohexane dimethanol, 2-2-bis (4-hydroxyphenyl) propane, 2,2-bis(4-hydroxyethoxphenyl) propane, bis(4-hydroxyphenyl) sulfone, bisphenol fluorenedihydroxyethyl ether, diethylene glycol, neopentylglycol, hydroquinone, and cyclohexanediol. Among the polyesters making these components as the main constitutional components, from the viewpoints of transparency, mechanical strength, and dimensional stability, polyesters preferably make terephthalic acid or 2,6-naphfhalene dicarboxylic acid as a dicarboxylic acid component and ethylene glycol or 1,4-cyclohexane dimethanol as a diol component in the main constitutional components. Of these, polyesters which make polyethylene terephfhalate or polyethylenenaphthalate as the main constitutional components; copolymerized polyesters composed of terephthalic acid, 2,6-naphthalene dicarboxylic acid, and ethylene glycol, and polyesters which makes a mixture of two or more kinds of the above polyesters as the main constitutional components are preferable.

The thickness of the film substrate (support) according to the present invention is preferably 50 to 300 μm, and more preferably 80 to 125 μm. Further, the film substrate of the present invention may be composed of two laminated sheets, and in this case, the two laminated sheets may be the same or different in kind.

[Refractive Index Difference]

In the present invention, it is characterized that a refractive index difference between at least tow neighboring layers (a high refractive index layer and a low refractive index layer) is 0.3 or more, at least one layer of the two neighboring layers contains a metal oxide, and at least one layer of the two neighboring layers contains a polyvinyl alcohol or an inorganic polymer. The refractive index difference is preferably 0.4 or more, and more preferably 0.45 or more. Further, there is no restriction specifically on an upper limit. However, usually, the refractive index difference is 1.4 or less.

Further, in the near-infrared reflective film of the present invention, the refractive index of a high refractive index layer is preferably 1.80 to 2.50, and more preferably 1.90 to 2.20. Also, the refractive index of a low refractive index layer is preferably 1.10 to 1.60, and more preferably 1.30 to 1.50.

Reflection on a layer interface between neighboring layers is dependent on the refractive index difference between the neighboring layers. According, the larger the refractive index difference is, the higher a reflectance is. In the case of assumption of a single layer film, if an optical path difference between a reflected light ray on the top surface of the layer and a reflected light ray on the bottom surface of the layer is made a relationship represented by (n*d=wavelength/4), the reflected light rays can be controlled by a phase difference so as to be strengthened, thereby increasing the reflectance. Herein, n represents a refractive index, d represents a physical layer thickness of a layer, and n*d represents an optical film thickness. The utilization of this optical path difference enables to control reflection. In a wavelength of 900 nm to 1400 nm, the film thickness of each layer is controlled by the utilization of this relationship, thereby controlling the transmission of visible light rays and the reflection of near-infrared light. That is, the reflectance of a light ray in a specific wavelength region is increased (up) in accordance with the refractive index of each layer, the layer thickness of each layer, ways to laminate respective layers.

For example, when a reflection center wavelength is made 950 nm, the refractive index and thickness of a high refractive index layer may be set to 1.9 and 125 nm respectively, and the refractive index and thickness of a low refractive index layer may be set to 1.4 and 170 nm respectively. Further, when a reflection center wavelength is made 550 nm of a visible light region, the refractive index and thickness of a high refractive index layer may be set to 1.9 and 72 nm respectively, and the refractive index and thickness of a low refractive index may be set to 1.4 and 98 nm respectively.

Among incident light spectrum of directly-reaching light rays of sunlight, light rays in an infrared region relate to indoor temperature rise. Accordingly, shielding of these light rays enables to suppress the indoor temperature rise. According to a cumulative energy ratio from the shortest wavelength (760 nm) to the longest wavelength of 3200 nm in the infrared region based on weighting coefficients described in Japanese Industrial Standards JIS R3106, when the total energy of the infrared whole region from the wavelength of 760 nm to the longest wavelength of 3200 is assumed as 100, in the cumulative energy from 760 nm to each wavelength, the total energy from 760 nm to 1300 nm occupies from 75% of the infrared whole region. The shielding of the wavelength region to 1300 nm makes the energy saving effect by the heat ray shielding the most efficient.

If a reflectance in this near-infrared (760 to 1300 nm) is made 80% or more at the maximum peak value, a fall in sensible temperature is obtained by sensory evaluation. For example, at the right side of the window oriented to the southeast direction in midmorning in August, when the reflectance of light rays in the near-infrared region was shielded to about 80% at the maximum peak value, a clear difference was detected.

As a result of an optical simulation (FTG Software Associates Film DESIGN Version 2.23.3700) to obtain a multiple layer structure required to exhibit such a function, it turned out that in the case where six layers or more are laminated by utilization of a high refractive index layer with a refractive index of 1.9 or more, preferably, 2.0 or more, an excellent characteristic can be obtained. For example, according to the simulation result of a model in which a high refractive index layer and a low refractive index layers (refractive index=1.35) are laminated alternately by eight layers, if the high refractive index layer has a refractive index of 1.8, a reflectance does not reach even 70%. However, if the high refractive index layer has a refractive index of 1.9, a reflectance of about 80% can be obtained. Further, in a model in which a high refractive index layer (refractive index=2.2) and a low refractive index layers (refractive index=1.35) are laminated alternately, if the number of layers is 4, a reflectance does not reach even 60%. However, if the number of layers is 6, a reflectance of about 80% can be obtained.

[Flexibility]

The flexibility in the present invention means a scale indicating how much a film maintains an optical property to be uniform when the film is bent by being applied with an external force. In the production stage, the flexibility is important in the productivity with the roll to roll operation such as handling, transportation, and wound-up. Further, in the application stage of a near-infrared reflective film, the flexibility is essential for the degree of processing such as cut and paste.

As a valuation method of this flexibility, a test sample is subjected to a bending test to bend the sample by 30 times by use of bending tester type 1 (Type: IMC-AOF2, Mandrel diameter: 20 mm, manufactured by Imoto Machinery Co, Ltd.) in accordance with a bending test method in accordance with JIS K5600-5-1, and the flexibility is represented by a change ration in optical performance before and after the bending test.

[Metal Oxide]

The metal oxide of the present invention is used at the time of constitution of the above-mentioned low refractive index layer or high refractive index layer. Examples of the metal oxides usable for the above object, include: titanium dioxide, zirconium oxide, zinc oxide, synthetic amorphous silica, colloidal silica, alumina, colloidal alumina, lead titanate, minium, chrome yellow, zinc yellow, chrome oxide, femic oxide, iron black, copper oxide, magnesium oxide, magnesium hydroxide, strontium titanate, yttrium oxide, niobium oxide, europium oxide, lanthanum oxide, zircon, and tin oxide.

The average particle size of the metal oxide according to the present invention may be determined as follows. The very figure of each particle or the figure of each particle appearing on the cross section or surface of a refractive index layer is observed through an electron microscope so as to measure the particle size of each of 1,000 arbitral particles, and then, the average particle size is determined as a simple average value (number average) of the 1,000 measurements. At this time, the particle size of each particle is determined as the diameter of a circle equal to the projected area of each particle.

As the metal oxide fine particles, solid fine particles selected from titanium dioxide, silicon dioxide, and alumina may be preferably used.

In the low refractive index layer, as the metal oxide, silicon dioxide (silica) is preferably used, and acidic colloidal silica is especially preferably used.

[Silicon Dioxide]

As the silicon dioxide (silica) usable in the present invention, silica or colloidal silica synthesized by ordinary wet methods, or silica synthesized by gas phase methods are preferably employed. However, as fine particle silica especially used preferably in the present invention, colloidal silica or fine particle silica synthesized by a gas phase method are preferable. Of these, fine particle silica synthesized by a gas phase method is preferable, because high porosity can be not only obtained, but also that bulky aggregates are not likely to be formed. Further, alumina or hydrated alumina may be crystallinity, or may be amorphous, and they may be used in arbitrary forms, such as indeterminate form particles, spherical particles, and acicular particles.

The metal oxide fine particles are preferable in a state of being dispersed to primary particles in a fine particle dispersion liquid.

The metal oxide fine particles have a particle size of preferably 100 nm or less. For example, in the case of the above fine particle silica treated in the gas phase method, metal oxide fine particles dispersed in a state of being primary particles have an average particle size of primary particles (particle size in a dispersion liquid state before coating) being preferably 100 nm or less, more preferably 4 to 50 nm, the most preferably 4 to 20 nm.

As the silica which is synthesized by the gas phase method, used the most preferably, and has an average particle size of primary particles being 4 to 20 nm, aerosil manufactured by Japanese Aerosil Company has been marketed. This silica synthesized by the gas phase method is easily sucked and dispersed in water by, for example, a jet stream inductor mixer manufactured by Mitamura Riken Industries Co, Ltd, whereby the silica can be dispersed comparatively easily into primary particles.

As this currently-marketed silica by the gas phase method, various kinds of aerosil manufactured by Japanese Aerosil Company may be employed.

The colloidal silica preferably used in the present invention can be obtained by heating and ripening silica sol which is obtained by making sodium silicate to cause double decomposition via acid and the like or by making sodium silicate to pass through and ion exchange resin layer. Examples of the colloidal silica are described in Official Report of each of Japanese Unexamined Patent Publication Nos. 57-14091, 60-219083, 60-219084, 61-20792, 61-188183, 63-17807, 4-93284, 5-278324, 6-92011, 6-183134, 6-297830, 7-81214, 7-101142, 7-179029, and 7-137431, and International Patent Publication No. WO94/26530.

Although the average particle size of colloidal silica is usually preferably 5 to 100 nm, it is particularly preferably 7 to 30 nm.

The surface of each of silica and colloidal silica synthesized by gas phase methods may be cationically modified, or may be treated with Al, Ca, Mg, Ba, or the like.

Further, preferable examples of the metal oxides contained in the high refractive index layer include $TiO_2$, ZnO, and $ZrO_2$. Of these, from the viewpoint of the stability of a below-mentioned metallic oxide particle-containing composition used to form a high refractive index layer, $TiO_2$ (titanium dioxide sol) is more preferable. Furthermore, among $TiO_2$, a rutile type is preferable than an anatase type, because the rutile type can increase the weather resistance of a high refractive index layer or a neighboring layer due to its lower catalytic activity, and further increase the refractive index.

[Titanium Dioxide]
Production method of producing a titanium dioxide sol

In the first process (Process (1)) in the production method of producing rutile type titanium oxide fine particles, a titanium dioxide hydrate is treated with at least one kind of basic compounds selected from a group consisting of a hydroxide of an alkali metal and a hydroxide of an alkaline earth metal.

The titanium dioxide hydrate can be obtained by hydrolysis of water-soluble titanium compounds, such as titanium sulfate, titanium chloride, and the like. Examples of the methods of the hydrolysis include, without being limited hereto, any known methods. Of these, the titanium dioxide hydrate may be preferably obtained through heat hydrolysis of titanium sulfate.

For example, Process (1) may be conducted in such a way that into the aqueous suspension liquid of the above titanium dioxide hydrate, the above basic compound was added, and the resulting liquid is treated (cause a reaction) for a predetermined time under the condition of a prescribed temperature.

The method of preparing the aqueous suspension liquid of the above titanium dioxide hydrate is not specifically limited to, and may be conducted by adding the above titanium dioxide hydrate into water, followed by agitating. Although the concentration of the suspension liquid is not limited, it is preferable that for example, the concentration of $TiO_2$ is 30 to 150 g/L in the suspension liquid. This range enables to advance the reaction (treatment) efficiently.

Examples of the at least one kind of basic compounds, used in Process (1), selected from a group consisting of the hydroxide of an alkali metal and the hydroxide of an alkaline earth metal include, without being specifically limited thereto, sodium hydroxide, potassium hydroxide, magnesium hydroxide, an calcium hydroxide. The added amount of the above basic compound in Process (1) is preferably 30 to 300 g/L as the concentration of basic-compound in the reaction (treatment) suspension liquid.

Process (1) is preferably conducted at a reaction (treatment) temperature of 60 to 120° C. Although a reaction (treatment) time may change depending on the reaction (treatment) temperature, it is preferably 2 to 10 hours. The reaction (treatment) may be preferably conducted by adding the aqueous solution of sodium hydroxide, potassium hydroxide, magnesium hydroxide, or calcium hydroxide into the suspension liquid of a titanium dioxide hydrate. After the reaction (treatment), the reaction (treatment) mixture is cooled, followed by being neutralized with inorganic acid such as hydrochloric acid, if needed, and then further followed by filtered and washed, whereby fine particles of titanium dioxide hydrate can be obtained.

Moreover, as the second process (Process (2)), the compound obtained in Process (1) may be treated with a carboxylic acid group-containing compound and an inorganic acid. Although methods of processing the compound obtained in Process (1) in the production of rutile type titanium oxide particles with an inorganic acid are known, particle size can be adjusted by use of the carboxylic acid group-containing compound in addition to the inorganic acid.

The above carboxylic acid group-containing compound is an organic compound having a —COOH group. Further, the above carboxylic acid group-containing compound is preferably a polycarboxylic acid which as two or more, preferably two or more and four or less carboxylic acid groups. Since the above polycarboxylic acid has a coordinating ability for metal atoms, it is assumed that the polycarboxylic acid suppresses aggregation between particles by coordination, whereby the rutile type titanium oxide fine particles can be obtained suitably.

Examples of the above carboxylic acid group-containing compound include, without being specifically limited hereto, dicarboxylic acid, such as oxalic acid, malonic acid, succinic acid, glutaric acid, adipic acid, propylmalonic acid, and maleic acid; hydroxy multivalent carboxylic acid, such as malic acid, tantaric acid, and citric acid; aromatic polycarboxylic acids, such as phthalic acid, isophthalic acid, hemimellitic acid, and trimellitic acid; and ethylenediaminetetraacetic acid. Among them, two or more kinds of the compounds may be used in combination simultaneously.

Further, all or a part of the above carboxylic acid group-containing compounds may be a neutralized compound (for example, an organic compound having a —COONa group) of an organic compound having a —COOH group.

Examples of the above inorganic acid include hydrochloric acid, sulfuric acid, and nitric acid. The inorganic acid may be added such that its concentration in the reaction (treatment) liquid becomes 0.5 to 2.5 mol/L, and more preferably 0.8 to 1.4 mol/L.

Process (2) is preferably conducted such that the compound obtained by Process (1) is suspended in purified water, and heated while being agitated if needed. The carboxylic acid group-containing compound and the inorganic acid may be added simultaneous, or may be added sequentially. However, it is preferable to add them sequentially.

In the addition, the inorganic acid may be added after the addition of the carboxylic acid group-containing compound, or the carboxylic acid group-containing compound may be added after the addition of the inorganic acid.

For example, according to Addition method (1), the carboxylic acid group-containing compound is added into the suspension liquid of the compound obtained in Process (1), and then heating is started. Subsequently, when a liquid temperature becomes 60° C. or more, preferably 90° C. or more, the inorganic acid is added, and agitated preferably for 15 minutes to 5 hours, more preferably for two to three hours while maintaining the liquid temperature. Further, according to Addition method (2), the suspension liquid of the compound obtained in Process (1) is heated, and when a liquid temperature becomes 60° C. or more, preferably 90° C. or more, the inorganic acid is added. At 10 to 15 minutes after the addition of the inorganic acid, the carboxylic acid group-containing compound is added, and agitated preferably for 15 minutes to 5 hours, more preferably for two to three hours while maintaining the liquid temperature. These methods enable to obtain rutile type titanium dioxide fine particles with a preferable particle shape.

In the case where Process (2) is conducted by Addition method (1), the above carboxylic acid group-containing compound may be preferably used in an amount of 0.25 to 1.5 mol% to 100 mol% of $TiO_2$, and more preferably used in an amount of 0.4 to 0.8 mol%. In the case where the added amount of the carboxylic acid group-containing compound is less than 0.25 mol%, there is a possibility that the growth of a particle progresses more than expected so that particles with a target particle size cannot be obtained. On the other hand, in the case where the added amount of the carboxylic acid group-containing compound is more than 1.5 mol%, there is a possibility that the formation of rutile in particles may not progress more than expected so that anatase type particles may be produced.

In the case where Process (2) is conducted by Addition method (2), the above carboxylic acid group-containing compound may be preferably used in an amount of 1.6 to 4.0 mol% to 100 mol% of $TiO_2$, and more preferably used in an amount of 2.0 to 2.4 mol%.

The added amount of the carboxylic acid group-containing compound being 1.6 to 4.0 mol% is preferable in obtaining the target particle size, and further, in advancing the formation of rutile in particles. In the case where the added amount of the carboxylic acid group-containing compound is less than 1.6 mol%, there is a possibility that the growth of a particle progresses more than expected so that particles with a target particle size cannot be obtained. On the other hand, in the case where the added amount of the carboxylic acid group-containing compound is more than 4.0 mol%, there is a possibility that the formation of rutile in particles may not progress more than expected so that anatase type particles may be produced. Accordingly, even if the added amount of the carboxylic acid group-containing compound exceeds 4.0 mol%, the effect does not become good. As a result, such an added amount is economically disadvantageous. Further, it is preferable to add the above carboxylic acid group-containing compound at 10 minutes or more and 15 minutes or less after the addition of the inorganic acid. If the adding is conducted at a time less than 10 minutes, there is a possibility that the formation of rutile in particles may not progress more than expected so that anatase type particles may be produced. On the other hand, if the adding is conducted at a time ore than 15 minutes after the addition of the inorganic acid, there is a possibility that the growth of a particle progresses more than expected so that particles with a target particle size cannot be obtained.

In Process (2), it is desirable to cool the resultant liquid after the completion of the reaction (treatment), and to neutralize the resultant liquid so as to have a pH of 5.0 to 10.0. This neutralization may be achieved with alkaline compounds, such as a sodium hydroxide aqueous solution and aqueous ammonia. After the neutralization, the resultant liquid is subjected to filtration and washing, whereby target rutile type titanium oxide fine particles are separated.

Moreover, as the production method of producing titanium oxide particles, well-known methods described on pp 255 to 258 in "Titanium oxide-physical properties and applied technology" (2000) (by Manabu Seino and published by Gihodo Shuppan Co., Ltd.).

The primary particle size of titanium oxide fine particles is preferably 5 nm to 15 nm, and more preferably 6 nm to 10 nm.

The average particle size of the metal oxide according to the present invention may be determined as follows. The very figure of each particle or the figure of each particle appearing on the cross section or surface of a refractive index layer is observed through an electron microscope so as to measure the particle size of each of 1,000 arbitral particles, and then, the average particle size is determined as a simple average value (number average) of the 1,000 measurements. At this time, the particle size of each particle is determined as the diameter of a circle equal to the projected area of each particle.

Further, in the present invention, a colloidal silica composite emulsion may also be used as a metal oxide in a low refractive index layer. In the colloidal silica composite emulsion preferably used in the present invention, a central portion of particle is composed of a polymer or a copolymer as main components. The colloidal silica composite emulsion is produced by polymerizing monomers having ethylenically unsaturated bonds under the existence of the colloidal silica through conventionally-known emulsion polymerization methods described in JPA Nos. 59-71316 and 60-127371. The particle size of the colloidal silica applied to the complex emulsion is preferably less than 40 nm.

As the colloidal silica used for preparation of this composite emulsion, primary particle with a particle size of 2 to 100 nm are usually employed. Examples of the ethylenic monomers include well-known material in the technical field of latex, such as a alkyl group with 1 to 18 carbon numbers, an aryl group, an (meth)acrylic ester having an allyl group, styrene, α-methylstyrene, vinyltoluene, acrylonitrile, vinyl chloride, vinylidene chloride, vinyl acetate, vinyl propionate, acrylamide, N-methylolacrylamide, ethylene, and butadiene. Further, auxiliary agents may be used. For example, in order to improve compatibility with colloidal silica more, vinyl silan, such as vinyl trimethoxysilan, vinyl triethoxysilane, an γ-methacrylooxypropyl trimethoxysilan may be used. Also, in order to disperse and stabilize the emulsion, anionic monomers, such as (meth)acrylic acid, maleic acid, maleic anhydride, fumaric acid, and crotonic acid may be used. Furthermore, two or more kinds of ethylenic monomers may be used in combination, if needed.

Moreover, the ratio of the ethylenic monomer to the colloidal silica in emulsion polymerization is preferably (100 to 1) to (100 to 200) in a solid content ratio.

The colloidal silica complex emulsion used in the present invention has preferably a glass transition point in a range of −30 to 30° C.

Moreover, preferable examples of the composition include ethylenic monomers, such as acrylic acid ester and methacrylic acid ester, and particularly preferable examples include a copolymer of (meth)acrylic acid ester and styrene, a copolymer of (meth)acrylic acid alkyl ester and (meth) acrylic acid aralkyl ester, and a copolymer of (meth)acrylic acid alkyl ester and (meth)acrylic acid aryl ester.

Examples of the emulsifier used in the emulsion polymerization, include: alkyl allylpolyether sulfonic acid soda salt, lauryl sulfonic acid soda salt, alkylbenzene sulfonic acid soda salt, polyoxyehtylene nonylphenyl ether nitrate soda salt, alkyl allyl sulfosuccinate soda salt, and sulfopropylmaleic acid mono-alkyl ester soda salt.

A preferable particle size is 10 nm or less in primary particle, and 30 nm or less in secondary particle, because haze becomes small, and visible light transmissivity becomes excellent.

At least one layer of a layer containing these inorganic oxide particles according to the present invention and a layer neighboring on this layer is formed by coating a liquid containing polyvinyl alcohol or inorganic polymer as binder. Further, at least one layer is formed by coating a liquid containing a hardenable resin composition containing well-known acrylic resin, polyester resin, or multi-functional acrylic compound as main components.

The content of metal oxides in each layer is preferably 50 weight % or more and 95 weight % or less, and more preferably 60 weight % or more and 90 weight % or less. The content of metal oxides in each layer being 50 weight % or more facilitates to enlarge a refractive index difference between a high refractive index layer and a low refractive index layer, and the content of metal oxides in each layer being 95 weight % or less facilitates to form a near-infrared reflective film.

[Polyvinyl Alcohol]

In the present invention, at least one layer of two neighboring layers contains a metal oxide, and at least one layer of two neighboring layers contains a polyvinyl alcohol or an inorganic polymer.

By making a layer contain a polyvinyl alcohol, the polyvinyl alcohol-containing layer itself is made to contain water, and by formation of a network with a hydrogen bond of OH among the constitutional elements of the layer, on the surface of the metal oxide, or by polyvinyl alcohol, it becomes possible to improve the flexibility.

Examples of the polyvinyl alcohol preferably used in the present invention include modified polyvinyl alcohols, such as terminally cationically-modified polyvinyl alcohol and anionically-modified polyvinyl alcohol with an anionic group in addition to ordinary polyvinyl alcohol obtained through hydrolysis of polyvinyl acetate.

The polyvinyl alcohol obtained through hydrolysis of polyvinyl acetate has preferably an average degree of polymerization being 1,000 or more, and particularly preferably an average degree of polymerization being in a range of 1,500 to 5,000. Further, a degree of saponification is preferably 70 to 100%, and particularly preferably 80 to 99.5%.

Examples of the cationically-modified polyvinyl alcohol include the polyvinyl alcohol disclosed in Japanese Unexamined Patent Publication No. 61-10483 which has primary to tertiary amino group or quaternary ammonium group on is main chain or side chain, and the cationically-modified polyvinyl alcohol can be obtained through saponification of a copolymer of an ethylenically-unsaturated monomer with a cationic group and vinyl acetate.

Example of the ethylenically-unsaturated monomer with a cationic group include trimethyl-(2-acrylamide 2,2-dimethylethyl) ammonium chloride, trimethyl-(3-acrylamide 3,3-dimethylpropyl) ammonium chloride, N-vinylimidazole, N-vinyl-2-methylimidazole, N-(3-dimethylaminopropyl) methacrylamide, hydroxyl ethyl trimethyl ammonium chloride, trimethyl-(2-methacrylamide propyl) ammonium chloride, and N-(1,1-dimethyl-3-dimethylaminopropyl) acrylamide.

In the cationically-modified polyvinyl alcohol, a ratio of a cationically-modified group-containing monomer to vinyl acetate is 0.1 to 10 mol%, and preferably 0.2 to 5 mol%.

Examples of the anionically-modified polyvinyl alcohol include polyvinyl alcohol with an anionic group as described in JPA (Japanese Unexamined Patent Publication No.) 1-206088, copolymer of vinyl alcohol and vinyl compound with a water-soluble group as described in JPA 61-237681 and JPA 63-307979, and modified polyvinyl alcohol with a water-soluble group as described in JPA 7-285265.

Further, examples of the nonionically-modified polyvinyl alcohol include polyvinyl alcohol derivative in which a poly alkylene oxide group is added to a part of polyvinyl alcohol as described in JPA 7-9758, and a block copolymer of a vinyl compound with a hydrophobic group and vinyl alcohol as described in JPA 8-25795. Two kinds or more of polyvinyl alcohols different in degree of polymerization and kind of modification may be used in combination.

The weight average molecular weight is preferably 1,000 or more and 200,000 or less, and more preferably 3,000 or more and 40,000 or less. If it is less than 1,000, the film formation ability is not sufficient. On the other hand, if it is more than 200,000, problems such as a viscosity rise tend to occur.

Moreover, in the present invention, the polyvinyl alcohol may be used in combination with other water-soluble binder. Examples of the water-soluble binder usable in combination include gelatin, polyethylene oxide, polyvinyl pyrrolidone, polyacrylic acid, polyacrylamide, polyurethane, dextran, dextrin, carrageenan (κ, ι, λ, etc.), agar, pullulan, water-soluble polyvinyl butyral, hydroxyethyl cellulose, and carboxymethyl cellulose. Two or more of these water soluble binders may be also used in combination.

Of these, particularly preferable examples include polyvinyl pyrrolidones, and copolymers containing the polyvinyl pyrrolidones.

The weight average molecular weight of the water soluble binder is preferably 1,000 or more and 200,000 or less, and more preferably 3,000 or more and 40,000 or less. If it is less than 1,000, the film formation ability is not sufficient. On the other hand, if it is more than 200,000, problems such as a viscosity rise tend to occur.

The added amount of the water soluble polymer is preferably 10 weight % or more and 200 weight % or less to the polyvinyl alcohol in which the water soluble polymer is dissolved. If the added amount is less than 10 weight %, the effect to suppress the growth and aggregation of pigment particles decreases. On the other hand, if the added amount exceeds 200 weight %, problems such as a viscosity rise and poor dissolution tend to occur.

[Hardening Agent]

In the present invention, if a hardening agent can cause a hardening effect with a polyvinyl alcohol, the hardening agent can be used as a hardening agent capable of being used together with the polyvinyl alcohol without specific limitation. However, boric acid and its salt are preferably used, and in addition, the other known hardening agents may be used. Generally, a compound having a group capable of reacting with a polyvinyl alcohol, or a compound capable of advancing a reaction among different groups included in a polyvinyl alcohol may be appropriately selected and used. Specific examples of the hardening agent include epoxy type hardening agent (diglycidyl ethyl ether, ethylene glycol diglycidyl ether, 1,4-butanediol diglycidyl ether, 1,6-diglycidyl cyclohexane, N,N-diglycidyl-4-glycidyloxyaniline, sorbitol polyglycidyl ether, glycerol polyglycidyl ether, etc.); aldehyde type hardening agents (formaldehyde, glyoxal, etc.), activity halogen type hardening agent (2,4-dichloro-4-hydroxy-1,3,5-s-triazine, etc.); activity vinyl type compounds (1,3,5-trisacryloylhexahydro-s-triazine, bisvinylsulfonyl methyl ether, etc.), boric acid and its salt; and aluminium alum.

Boric acid or its salt means oxygen acid or its sale which has a boron atom as a central atom, and specific example of them include orthoboric acid, diboric acid, metaboric acid, tetraboric acid, pentaboric acid, octaboric acid, and those salts.

Boric acid or its salt which is used as a hardening agent and has a boron atom, may be used as an aqueous solution containing only one kind of them or a mixture of two or more kinds of them, and preferably a mixture of boric acid and borax.

Since boric acid or its salt forms a network with a polyvinyl alcohol or a metal oxide (especially, titanium oxide) via a hydrogen bond, they are preferable.

An aqueous solution of each of boric acid and borax can be added only in a state of a comparatively dilute aqueous solution. However, a mixture of them can form a dense aqueous solution, thereby making it possble to concentrate a coating liquid. Further, there is another advantage which the pH of the added aqueous solution can be controlled comparatively freely.

The total used amount of the above-mentioned hardening agent is preferably 1 to 600 mg per 1 g of polyvinyl alcohol, and more preferably 100 to 600 mg per 1 g of polyvinyl alcohol.

[Inorganic Polymer]

In the present invention, among at least two neighboring layers, at least one layer contains a metal oxide, and at least one layer contains a polyvinyl alcohol or inorganic polymer.

Examples of the inorganic polymer include inorganic polymer composed of a metal oxide formed by performing hydrolytic polycondensation via a sol-gel method in a metal salt compound capable of causing hydrolytic polycondensation. However, in particular, preferable examples include inorganic polymer formed by performing hydrolytic polycondensation in a compound containing a zirconium atom shown below or a compound containing an aluminium atom.

In these inorganic polymers, an OH group produced in process of hydrolysis remains after a polycondensation reaction. Accordingly, similarly to polyvinyl alcohol, the inorganic polymers also have an effect to make an inorganic polymer-containing layer itself to contain water. Therefore, it may be considered that since a network with a hydrogen bond of OH is formed among the constitutional elements of the layer, among the constitutional layers, and among the inorganic polymers, it becomes possible to improve the flexibility.

Examples of the compound containing the zirconium atom which becomes respective precursors of these inorganic polymer and are used in the present invention, include: difluoride zirconyl, trifluoride zirconyl, tetrafluoride zirconyl, Hexafluoro zirconyl acid salt (for example, potassium salt), heptafluoro zirconyl acid salt (for example, sodium salt, potassium salt and ammonium salt), octafluoro zirconyl acid salt (for example, lithium salt), fluoridation oxidation zirconyl, dichloride zirconyl, trichloride zirconyl, tetrachloride zirconyl, hexachloro zironyl acid salt (for example, sodium salt and potassium salt), an acid zirconyl chloride (zirconyl chloride), dibromide zirconyl, tribromide zirconyl, tetrabromide zirconyl, bromination oxidation zirconyl, triiodination zirconyl, hexaiodiation zirconyl, hyperoxidation zirconyl, zirconium hydroxide, sulfuration zirconyl, zirconium sulfate, p-toluenesulfonic acid zironcyl, zirconium sulfate, zirconium sulfate, acid zirconium sulfate trihydrate, zirconium sulfate potassium, selenic acid zirconyl, zirconium nitrate, zirconium nitrate, phosphoric acid zyrconyl, carbonic acid zirconyl, carbonic acid zirconyl ammonium, acetic acid zirconyl, acetic acid zirconyl, acetic acid zirconyl ammonium, lactic acid zirconyl, citric acid zirconyl, stearic acid zirconyl, phosphoric acid zyrconyl, oxalic acid zirconyl, zirconyl isopropylate, zirconyl butyrate, zirconyl acetylacetonate, acetylacetone zirconyl butyrate, stearic-acid-zirconyl butyrate, zirconyl acetate, bis (acetylacetonato) dichloro zirconyl, and tris (acetylacetonate) chloro zirconyl.

Of these compounds, carbonic acid zirconyl, carbonic acid zirconyl ammonium, acetic acid zirconyl, zirconium nitrate, zirconyl chloride, lactic acid zirconyl, and citric acid zirconyl are preferable, and carbonic acid zirconyl ammonium, zirconyl chloride, and acetic acid zirconyl are especially preferable. Examples of the specific trade names of the above compounds include Zircozol ZA-20 (acetic acid zirconyl) manufactured by Daiichi Kigenso Kagaku Kogyo Co., Ltd., Zircozol ZC-2 (zirconyl chloride) manufactured by Daiichi Kigenso Kagaku Kogyo Co., Ltd., and Zircozol ZN (zirconium nitrate) manufactured by Daiichi Kigenso Kagaku Kogyo Co., Ltd.

The compound containing zirconium atoms may be used independently, or may be used together in combination of two or more different kinds of compounds.

The metal compound containing zirconium atoms may be preferably used in an amount of 0.01 to 5 g per 1 m$^2$, more preferably in a range of 0.05 to 2 g, and particularly preferably in a range of 0.1 to 1 g. The added amount may be different depending on the thickness of a low refractive index layer formed or a high refractive index layer to be formed.

Specific examples of the compound containing aluminium atoms which can be used in the present invention, include: aluminium fluoride, hexafluoroaluminate (for example, potassium salt), aluminium chloride, basic aluminum chloride (for example, polyaluminum chloride), tetrachloroaluminate (for example, sodium salt), aluminum bromide, tetrabromoaluminate (for example, potassium salt), aluminium iodide, aluminate (for example, sodium salt, potassium salt, calcium salt), aluminium chlorate, aluminium perchlorate, aluminium thiocyanate, aluminium sulfate, basic aluminium sulfate, potassium aluminum sulfate (alum), aluminium ammonium sulfate (ammonium alum), sulfuric acid sodium aluminum, aluminum phosphate, aluminium nitrate, aluminium hydrogen phosphorate, aluminum carbonate, aluminum silicate polysulfurate, aluminium formate, aluminium acetate, aluminum lactate, aluminium oxalate, aluminum isopropylate, aluminium butyrate, ethyl acetate aluminum diisopropylate, aluminium tris (acetylacetonate), aluminium tris (ethylacetoacetate), and aluminium mono-acetylacetonate bis (ethyl acetacetonate).

Of these, aluminium chloride, basic aluminum chloride, aluminium sulfate, basic aluminium sulfate, and basic aluminum silicate sulfurate are preferable, and basic aluminum chloride and basic aluminium sulfate are the most preferable.

In order to make metal compounds such as compounds containing zirconium atoms or compounds containing aluminium atoms to cause hydrolytic polycondensation by application of a sol-gel method, an acid catalyst is preferably added so as to cause hydrolysis and to advance a condensation reaction. This composition is coated on a layer which is a substrate or a lower layer, dried, and thereafter, if required, followed by heat treatment, ultraviolet treatment, or plasma treatment, thereby obtaining a high refractive index layer or low refractive index layer in which three-dimensional cross-linkages are advanced.

Here, as a catalyst, inorganic acid, such as hydrochloric acid, sulfuric acid, and nitric acid, and organic acids, such as acetic acid, trifluoroacetic acid, levulininc acid, citric acid, p-toluenesulfonic acid, and methanesulforic acid are usually used. Further, after a sol-gel reaction with addition of an acid has advanced, a base may be added for neutralization. In the case of neutralization with addition of a base, it is desirable that the content of alkali metal before a dry process is less than 5000 ppm (here, the alkali metal includes an alkali metal in an ion state). Further, Lewis acids, such acetate salts of metals such as germanium, titanium, aluminium, antimony, and tin; other organic acid salts, halide, and phosphate, may be used in combination. Furthermore, the reaction of the hydrolytic polycondensation of the metallic compound may be completed in a liquid state before coating or may be completed after the coating.

As the catalyst, instead of such acids, bases, for examples, monoethanolamine, diethanolamine, triethanolamine, diethylamine, triethylamine, bicyclo ring type amines, such as DBU (diazabicycloundecen-1) AND DBN (diaza bicyclononene), ammonia, and phosphine may be used. Further, the treatment of an acid and the treatment of a base may be conducted together by two or more times.

Such a catalyst may be neutralized, and a volatile catalyst may be removed by a reduced pressure or removed by washing with a separation liquid.

A reactive metal compound is dissolved in a solvent. At this time, as the solvent, a water-miscible organic solvent may be used. At the time of formation of layer, since a solvent is needed to be evaporated, a volatile solvent may be preferable. In addition to it, the solvent is preferably required not to react with the reactive metal compound and the catalyst and not to dissolve a substrate or a lower layer. Two or more kinds of solvents may be used as a mixture. Examples of the water-miscible solvent include alcohols, such as ethyl alcohol, methyl alcohol, isopropyl alcohol, n-propyl alcohol, and methoxy methyl alcohol; acetone, methyl ethyl ketone, tetrahydrofuran, 1,4-dioxane, 1,3-dioxolane, dimethylimidazolinon, dimethylformamide, dimethylacetamide, acetonitrile, dimethylsulfoxide, and sulfolane. Of these, 1,3-dioxolane, ethyl alcohol, methyl ethyl ketone, and acetone are preferable.

[Other Additives]

Various kinds of additives may be added for each layer (film) of the near-infrared reflective film of the present invention. Examples of additives include organic latex fine particles, such as polystyrene, polyacrylic acid esters, polymethacrylic acid esters, olyacrylamides, polyethylene, polypropylene, polyvinyl chloride, polyvinylidene chloride or their copolymers, urea resin, and melamine resin; various kinds of surfactants such as cation and nonion; ultraviolet absorbers described in JPA No. (Japanese Unexamined Patent Publication No.) 57-74193, 57-87988, and 62-261476; fading inhibitors described in JPA No. 57-74192, 57-87989, 60-72785, 61-146591, 1-95091, and 3-13376; and the various kinds of known additives such as fluorescent whitener; pH adjusters, i.e., sulfuric acid, phosphoric acid, acetic acid, citric acid, sodium hydroxide, potassium hydroxide, and potassium carbonate; defoaming agent; lubricants such as diethylene glycol; antiseptics; antistatic agent; and matting agent, described in JPA No. 59-42993, 59-52689, 62-280069, 61-242871, and 4-219266.

[Production Method with Multi-Layer Coating]

The near-infrared reflective film of the present invention is constituted such that multiple constituting layers each including a high refractive index layer and a low refractive index layer are coated separately independently or simultaneously and dried on a substrate by a coating method selected appropriately from the known coating methods. Preferable examples of the coating methods, include: a roll coating method, rod bar coating method, air-knife coating method, spray coating method, curtain coating method, slide bead coating methods using a hopper which are described in U.S. Pat. Nos. 2,761,419 and 2,761,791, and extrusion coat method.

At the time of performing a simultaneous multilayer coating, the viscosity of each of the high refractive index layer coating liquid and a low refractive index layer coating liquid is preferably in a range of 5 to 100 mPa*s in the case of a slide bead coating method, and more preferably in a range of 10 to 50 mPa*s. Further, in the case of a curtain coating method, it is preferably in a range of 5 to 1,200 mPa*s, and more preferably in a range of 25 to 500 mPa*s.

Further, the viscosity a coating liquid at 15° C. is preferably 100 mPa*s or more, more preferably 100 to 30,000 mPa*s, still more preferably 3,000 to 30,000 mPa*s, and most preferably 10,000 to 30,000 mPa*s.

In the coating and drying procedures, each of a high refractive index layer coating liquid and a low refractive index layer coating liquid are heated to 30° C. or more, and coated. After the coating, the temperature of the coated film was cooled once to 1 to 15° C., and then dried at 10° C. more. More preferably, as the drying condition, a wet bulb temperature is 5 to 50° C., and a film surface temperature is in a range of 10 to 50° C. Further, from the viewpoint of uniformity of the formed coated film, it is desirable to conduct a horizontal set method as the cooling method immediately after the coating.

Moreover, at the time of preservation of a near-infrared reflective film, the near-infrared reflective film is preferably preserved on a roll after being over-coated and dried, or preserved after being cut into a sheet. The preservation for a prescribed time period, for example, one day to one month, at 30° C. or more is helpful for reducing coating unevenness. A preferable preservation condition is one to 30 days at 30 to 50° C.

[Application of a Near-Infrared Reflective Film]

The near-infrared reflective film of the present invention is applicable to broad fields. For example, for the purpose of mainly enhancing weather resistance, the near-infrared reflective film is used as heat ray reflecting films with an effect to reflect heat rays. Actually, the near-infrared reflective film is used as film to be passed on windows such as outdoor windows of buildings or car windows which are exposed to sunbeams for a long time, and film for agricultural Vinyl greenhouses. The near-infrared reflective film according to the present invention is especially suitable as a member to be pasted directly or via adhesive onto glass or resin substrate used in place of glass.

In the case of pasting on a window glass, adhesives are disposed such that the near-infrared reflective film is positioned at the sunbeam (heat ray) incident side. Further, the sandwiching of the near-infrared reflective film between the window glass and the substrate enables to seal the near-infrared reflective film from environment gas such as moisture. Accordingly, it is preferable from the point of durability. The disposition of the near-infrared reflective film of the present invention at the outdoor or the outside (for pasting on outside) of vehicles is preferable to enhance the durability for environment.

As adhesives applicable to the present invention, adhesives including light hardenable or heat hardenable resin as main components may be used.

The adhesives are preferable to have durability for the ultraviolet light, and acrylic-based adhesive and silicone-based adhesive are desirable. Further, from the viewpoints of adhesion characteristics and cost, acrylic type adhesive are more preferable. Furthermore, specifically from the viewpoints of easy control of peel-off resistance, in comparison between solvent-type or emulsion-type acrylic-based adhesive, the solvent-type is preferable. In the case of use of solution polymerization polymer as acrylic solvent type adhesive, well-known monomer can be used.

Further, as an interlayer of a pasted glass, polyvinyl butyral resin or ethylene-vinylacetate copolymer resin may be used. Specific examples include plasticity polyvinyl butyral (manufactured by Sekisui Chemical Co., Ltd., and Mitsubishi Monsanto Co., etc.), ethylene-vinylacetate copolymer (Duramin, manufactured by E. I. du Pont de Nemours & Co., and Takeda Chemical Industries, Ltd.), modified ethylene-vinylacetate copolymer (Melsen G, manufactured by TOSOH CORP.). Moreover, into the adhesive layer, an ultraviolet absorber, anti-oxidant, antistatic agent, heat stabilizer, lubricant, bulking agent, coloring agent, adhesion regulating agent, and the like are suitably added and blended.

EXAMPLE

Hereafter, although the present invention is described specifically based on examples, the present invention should not be limited to these examples. In the examples, the indication of "parts" or "%" represents "parts by weight" or "% by weight" unless otherwise specified.

Example 1

(Sample 1-Comparative Example)

On a polyethylene terephyhalate (PET) film (thickness: 125 μm), a $ZrO_2$ film (thickness: 135 nm) as a high refractive index layer and a SiO₂ film (175 nm) as a low refractive index layer were produced by the well-known spattering process.
(Sample 2-Comparative Example)

On a PET film, a TiO₂ film (thickness: 135 nm) as a high refractive index layer and a SiO₂ film (175 nm) as a low refractive index layer were produced by the well-known spattering process.
(Sample 3-Comparative Example)

On a PET film, as a high refractive index layer; 100 parts of zirconia sol (Nanouse ZR30-AR, manufactured by Nissan Chemistry Co., Ltd.) and 20 parts of acrylic latex (TOCRYL X-4454, manufactured by Toyo Ink Co., Ltd.) were coated so as to form a dry film thickness of 135 nm by a wire bar.

On a PET film, as a low refractive index layer, 100 parts of colloidal silica (Snowtex OS, manufactured by Nissan Chemistry Co., Ltd.) and 15 parts of acrylic latex (TOCRYL X-4454, manufactured by Toyo Ink Co., Ltd.) were coated so as to form a dry film thickness of 175 nm by a wire bar.
(Sample 4-Comparative Example)

On a PET film, as a high refractive index layer; 100 parts of rutile type titanium dioxide fine particles (55N, manufactured by Ishihara Sangyo Kaisha, Ltd.) and 15 parts of acrylic latex (TOCRYL X-4454, manufactured by Toyo Ink CO., Ltd.) were coated so as to form a dry film thickness of 135 nm by a wire bar.

On a PET film, as a low refractive index layer, 100 parts of colloidal silica (Snowtex OS, manufactured by Nissan Chemistry Co., Ltd.) and 10 parts of acrylic latex (TOCRYL X-4454, manufactured by Toyo Ink Co., Ltd.) were coated so as to form a dry film thickness of 175 nm by a wire bar.
(Sample 5-Comparative Example)

On a PET film, as a high refractive index layer, 100 parts of rutile type titanium dioxide fine particles (55N, manufactured by Ishihara Sangyo Kaisha, Ltd.) and 11 parts of acrylic latex (TOCRYL X-4454, manufactured by Toyo Ink Co., Ltd.) were coated so as to form a dry film thickness of 135 nm by a wire bar.

On a PET film, as a low refractive index layer, 100 parts of colloidal silica (Snowtex OS, manufactured by Nissan Chemistry Co., Ltd.) and 10 parts of acrylic latex (TOCRYL X-4454, manufactured by Toyo Ink Co., Ltd.) were coated so as to form a dry film thickness of 175 nm by a wire bar.
(Sample 6-Comparative Example)

On a PET film, as a high refractive index layer, 100 parts of rutile type titanium dioxide fine particles (55N, manufactured by Ishihara Sangyo Kaisha, Ltd.) and 7 parts of acrylic latex (TOCRYL X-4454, manufactured by Toyo Ink Co., Ltd.) were coated so as to form a dry film thickness of 135 nm by a wire bar.

On a PET film, as a low refractive index layer, 100 parts of colloidal silica (Snowtex OS, manufactured by Nissan Chemistry Co., Ltd.) and 5 parts of acrylic latex (TOCRYL X-4454, manufactured by Toyo Ink Co., Ltd.) were coated so as to form a dry film thickness of 175 nm by a wire bar.
(Sample 7-Inventive Example)

On a PET film, as a high refractive index layer, 100 parts of zirconia sol (Nanouse ZR30-AR, manufactured by Nissan Chemistry Co., Ltd.) and 12 parts of polyvinyl alcohol (PVA 203, manufactured by Kuraray Co., Ltd.) were coated so as to form a dry film thickness of 135 nm by a wire bar.

On a PET film, as a low refractive index layer, 12 parts of polyvinyl alcohol (PVA 203, manufactured by Kuraray Co., Ltd.) was coated so as to form a dry film thickness of 175 nm by a wire bar.
(Sample 8-Inventive Example)

On a PET film, as a high refractive index layer, 100 parts of zirconia sol (Nanouse ZR30-AR, manufactured by Nissan Chemistry Co., Ltd.) and 10 parts of polyvinyl alcohol (PVA 203, manufactured by Kuraray Co., Ltd.) were coated so as to form a dry film thickness of 135 nm by a wire bar.

On a PET film, as a low refractive index layer, 10 parts of polyvinyl alcohol (PVA 203, manufactured by Kuraray Co., Ltd.) was coated so as to form a dry film thickness of 175 nm by a wire bar.
(Sample 9-Inventive Example)

On a PET film, as a high refractive index layer, 100 parts of rutile type titanium dioxide fine particles (55N, manufactured by Ishihara Sangyo Kaisha, Ltd.) and 12 parts of polyvinyl alcohol (PVA 203, manufactured by Kuraray Co., Ltd.) were coated so as to form a dry film thickness of 135 nm by a wire bar.

On a PET film, as a low refractive index layer, 12 parts of polyvinyl alcohol (PVA 203, manufactured by Kuraray Co., Ltd.) was coated so as to form a dry film thickness of 175 nm by a wire bar.
(Sample 10-Inventive Example)

On a PET film, as a high refractive index layer, 100 parts of rutile type titanium dioxide fine particles (55N, manufactured by Ishihara Sangyo Kaisha, Ltd.) and 10 parts of polyvinyl alcohol (PVA 203, manufactured by Kuraray Co., Ltd.) were coated so as to form a dry film thickness of 135 nm by a wire bar.

On a PET film, as a low refractive index layer, 100 parts of colloidal silica (Snowtex OS, manufactured by Nissan Chemistry Co., Ltd.) and 12 parts of polyvinyl alcohol (PVA 203, manufactured by Kuraray Co., Ltd.) was coated so as to form a dry film thickness of 175 nm by a wire bar.
(Sample 11- Inventive Example)

On a PET film, as a high refractive index layer, 100 parts of rutile type titanium dioxide fine particles (55N, manufactured by Ishihara Sangyo Kaisha, Ltd.) and 60 parts of inorganic polymer (Zircozol ZC-2, manufactured by DAICHI KIGENSO KAGAKU KOGYOU Co., Ltd.) were coated so as to form a dry film thickness of 135 nm by a wire bar.

On a PET film, as a low refractive index layer, 12 parts of polyvinyl alcohol (PVA 203, manufactured by Kuraray Co., Ltd.) was coated so as to form a dry film thickness of 175 nm by a wire bar.
(Sample 12-Inventive Example)

On a PET film, as a high refractive index layer, 100 parts of rutile type titanium dioxide fine particles (55N, manufactured by Ishihara Sangyo Kaisha, Ltd.) and 60 parts of inorganic polymer (Zircozol ZC-2, manufactured by DAICHI KIGENSO KAGAKU KOGYOU Co., Ltd.) were coated so as to form a dry film thickness of 135 nm by a wire bar.

On a PET film, as a low refractive index layer, 100 parts of colloidal silica (Snowtex OS, manufactured by Nissan Chemistry Co., Ltd.) and 12 parts of polyvinyl alcohol (PVA 203, manufactured by Kuraray Col., Ltd.) was coated so as to form a dry film thickness of 175 nm by a wire bar.
(Sample 13-Inventive Example)

On a PET film, as a high refractive index layer, 100 parts of rutile type titanium dioxide fine particles (55N, manufactured by Ishihara Sangyo Kaisha, Ltd.), 10 parts of polyvinyl alcohol (PVA 203, manufactured by Kuraray Co., Ltd.), and 0.5 parts of epoxy type compound 1 (ethylene glycol diglycidyl ether) were coated so as to form a dry film thickness of 135 nm by a wire bar, and made to cause a cross linkage reaction with 3000 mJ by use of a commercially-available UV hardening lamp.

On a PET film, as a low refractive index layer, 100 parts of colloidal silica (Snowtex OS, manufactured by Nissan Chemistry Co., Ltd.), 12 parts of polyvinyl alcohol (PVA 203, manufactured by Kuraray Co., Ltd.), and 0.6 parts of epoxy type compound 1 (ethylene glycol diglycidyl ether) were coated so as to form a dry film thickness of 175 nm by a wire bar, and made to cause a cross linkage reaction with 3000 mJ by use of a commercially-available UV hardening lamp.

(Sample 14-Inventive Example)

On a PET film, as a high refractive index layer, 100 parts of rutile type titanium dioxide fine particles (55N, manufactured by Ishihara Sangyo Kaisha, Ltd.) 8 parts of polyvinyl alcohol (PVA 203, manufactured by Kuraray Co., Ltd.), and 0.4 parts of boric acid were coated so as to form a dry film thickness of 135 nm by a wire bar.

On a PET film, as a low refractive index layer, 100 parts of colloidal silica (Snowtex OS, manufactured by Nissan Chemistry Co., Ltd.), 10 parts of polyvinyl alcohol (PVA 203, manufactured by Kuraray Co., Ltd.), and 0.5 parts of boric acid were coated so as to form a dry film thickness of 175 nm by a wire bar.

(Sample 15-Inventive Example)

Titania particle liquid 1 was prepared by the following well-known procedures.

Titanium chloride was treated with a base and suspended with 30 g/L of water, and citric acid was added in an amount of 0.7 mol% to titanium oxide. Successively, the resulting liquid was heated to 90° C. at arte of 10° C./minute, followed by addition f30 g/L of hydrochloric acid, and agitated for 2.5 hours. Subsequently, after cooling of the liquid, lysine was added in an amount of 5 mol% to the titanium oxide, and pH was adjusted to 3 with sodium hydroxide, whereby titania fine particle liquid 1 was prepared.

On a PET film, as a high refractive index layer, 100 parts, as a titanium oxide soli component, of the titania fine particle liquid 1, 8 parts of polyvinyl alcohol (PVA 203, manufactured by Kuraray Co., Ltd.), 0.4 parts of boric acid, and 4 parts of inorganic polymer (Zirocozol ZC-2, manufactured by DAI-CHI KIGENSO KAGAKU KOGYOU Co., Ltd.) were coated so as to form a dry film thickness of 135 nm by a wire bar.

On a PET film, as a low refractive index layer, 100 parts of colloidal silica (Snowtex OS, manufactured by Nissan Chemistry Co., Ltd.), 10 parts of polyvinyl alcohol (PVA 203, manufactured by Kuraray Co., Ltd.), 0.5 parts of boric acid, and 3 parts of inorganic polymer (Zircozol ZC-2, manufactured by DAICHI KIGENSO KAGAKU KOGYOU Co., Ltd.) were coated so as to form a dry film thickness of 175 nm by a wire bar.

(Evaluation of Samples)

Each of obtained Samples 1 to 15 was subjected to a refractive index measurement of a single layer sample.

Further, a lamination sample was prepared for each of Samples 1 to 15 in such a way that six high refractive index layers and six low refractive index layers were alternately laminated on a PET film, and then the lamination sample was subjected to a reflection spectrum measurement, whereby it was confirmed that each of obtained Samples 1 to 15 has reflection on a near infrared region in the vicinity of 1200 nm.

Furthermore, the lamination sample was subjected to a flexibility evaluation.

[Evaluation Method-Reflection Spectrum Measurement]

A lamination film was formed on a PET film, and a reflection spectrum for a range (300 nm to 2000 nm) was measured with a commercially-available spectrophotometer (with use of an integrating sphere, for example, U-4000, manufacture by Hitachi, Ltd.).

[Evaluation Method-Refractive Index Measurement of a Single Film]

A single film of each of the high refractive index layer and the low refractive index layer was formed on a PET film, and the value of a refractive index for a wavelength of 589 nm (D line of Na) was measured with a analyzing device for an optical thin layer, such as a spectroscopic ellipsomter (for example, JOVIN YVON).

[Evaluation Method-Flexibility Evaluation]

A sample was prepared in such a way that six high refractive index layers and six low refractive index layers were alternately laminated on a PET film. Each of the near-infrared reflective films produced in the above was subjected to a bending test to bend a sample by 30 times by use of bending tester type 1 (Type: IMC-AOF2, Mandrel diameter: 20 mm, manufactured by Imoto Machinery Co., Ltd.) in accordance with a bending test method in accordance with JIS K5600-5-1.

The value of the reflectance at 1200 nm before the bending test was compared with that after the bending test so as to obtain a change amount of the reflectance (the reflectance % before the bending test-the reflectance % after the bending test), and the change amount was made as an evaluation value. When the bending was repeated, for the sample, cracks occur in a coating film of a sample inferior in flexibility, or the coating film becomes muddy white. Accordingly, the reflectance of the sample inferior in flexibility is changing. The smaller value in Table indicates that the change of the reflectance is smaller and the flexibility is more excellent.

In Table 1, the evaluation results of the refractive index difference of the single layer sample and the flexibility of the lamination sample are shown. As being clear from the results in Table 1, it turns out that Samples satisfying the present invention can attain both the refractive index difference and the flexibility.

TABLE 1

| | | High reflective index layer constitution | | | Low reflective index layer constitution | | | | Evaluation results | | |
| | | | | | | | | | | Reflective index of high | Reflective index of low | |
| No. | Comparative or Inventive | Producing method | Metal oxides | Binder | Producing method | Metal oxides | Binder | Δ Reflective index | reflective index layer | Reflective index layer | Flexibility (%) |
|---|---|---|---|---|---|---|---|---|---|---|---|
| 1 | Comparative | Sputtering | $ZrO_2$ | Nil | Sputtering | $SiO_2$ | Nil | 0.35 | 1.80 | 1.45 | 12 |
| 2 | Comparative | Sputtering | $TiO_2$ | Nil | Sputtering | $SiO_2$ | Nil | 0.50 | 1.45 | 1.45 | 11 |
| 3 | Comparative | Coating | $ZrO_2$ | Acrylic latex | Coating | $SiO_2$ | Acrylic latex | 0.28 | 1.73 | 1.45 | 7.00 |
| 4 | Comparative | Coating | $TiO_2$ | Acrylic latex | Coating | $SiO_2$ | Acrylic latex | 0.25 | 1.70 | 1.45 | 7.50 |
| 5 | Comparative | Coating | $TiO_2$ | Acrylic latex | Coating | $SiO_2$ | Acrylic latex | 0.31 | 1.76 | 1.45 | 8 |
| 6 | Comparative | Coating | $TiO_2$ | Acrylic latex | Coating | $SiO_2$ | Acrylic latex | 0.50 | 1.95 | 1.45 | 9 |
| 7 | Inventive | Coating | $ZrO_2$ | PVA | Coating | Nil | PVA | 0.33 | 1.81 | 1.48 | 2.40 |
| 8 | Inventive | Coating | $ZrO_2$ | PVA | Coating | Nil | PVA | 0.40 | 1.88 | 1.48 | 2.50 |
| 9 | Inventive | Coating | $TiO_2$ | PVA | Coating | Nil | PVA | 0.42 | 1.90 | 1.48 | 1.50 |

TABLE 1-continued

|  |  | High reflective index layer constitution | | | Low reflective index layer constitution | | | Evaluation results | | | |
| --- | --- | --- | --- | --- | --- | --- | --- | --- | --- | --- | --- |
| No. | Comparative or Inventive | Producing method | Metal oxides | Binder | Producing method | Metal oxides | Binder | Δ Reflective index | Reflective index of high reflective index layer | Reflective index of low reflective index layer | Flexibility (%) |
| 10 | Inventive | Coating | TiO$_2$ | PVA | Coating | SiO$_2$ | PVA | 0.44 | 1.88 | 1.44 | 1.00 |
| 11 | Inventive | Coating | TiO$_2$ | ZC-2 | Coating | Nil | PVA | 0.42 | 1.90 | 1.48 | 1.40 |
| 12 | Inventive | Coating | TiO$_2$ | ZC-2 | Coating | SiO$_2$ | PVA | 0.44 | 1.91 | 1.47 | 0.90 |
| 13 | Inventive | Coating | TiO$_2$ | PVA + Epoxy type compound 1 | Coating | SiO$_2$ | PVA + Epoxy type compound 1 | 0.46 | 1.90 | 1.44 | 0.60 |
| 14 | Inventive | Coating | TiO$_2$ | PVA + Boric acid | Coating | SiO$_2$ | PVA + Boric acid | 0.48 | 1.92 | 1.44 | 0 |
| 15 | Inventive | Coating | TiO$_2$ | ZC-2 + PVA + Boric acid | Coating | SiO$_2$ | ZC-2 + PVA + Boric acid | 0.50 | 1.94 | 1.44 | 0 |

PVA: Polyvinyl alcohol

Example 2

A lamination layer was formed by use of the high refractive index layer and the low refractive index layer in Sample 15 such that the physical layer thickness was adjusted to make each constitution layer have an optical layer thickness of 230 nm, and then, the number of layers and the characteristics of the reflection spectrum were observed. All the layers have the near-infrared absorption with the maximum at 1200 nm in a range from the vicinity of 900 nm to the vicinity of 1700 nm. In the case of the number of laminated layers was four for each of the high refractive layer and the low refractive layer, on the maximum region at 1200 nm, the reflectance was about 40%. As compared with this, in the case of the number of laminated layers was six for each of the high refractive layer and the low refractive layer, the reflectance increased to about 80%. Accordingly, it was confirmed that near infrared rays can be cut sufficiently with the constitution of the present invention.

Example 3

[Production of a Near-Infrared Reflector 1]

A near-infrared reflector 1 was produced using the respective near-infrared reflective film of Sample 8 produced in the Example 1. That is, the near-infrared reflector 1 was produced in such a way that the near-infrared reflective film of Sample 8 was pasted on a transparent acrylic resin plate with a thickness of 5 mm and a size of 20 cm×20 cm with an acrylic adhesive.

[Production of a Near-Infrared Reflector 2]

A near-infrared reflector 2 was produced using the respective near-infrared reflective film of Sample 12 produced in the Example 1. That is, the near-infrared reflector 2 was produced in such a way that two glass plates with a thickness of 2 mm and a size of 20 cm×20 cm were prepared, a polyvinyl butyral film with a thickness of 0.5 mm was disposed on both sides of the near-infrared reflective film of Sample 8 so as to form a laminated member, and the resultant laminated member was sandwiched between the two glass plates, followed by pressing and heating treatment, whereby the near-infrared reflector 2 being a glass composite was produced.

[Evaluation]

The near-infrared reflectors 1 and 2 produced in the above show examples of application of the near-infrared reflective film. Even when such reflectors are produced, the near-infrared reflective film can be utilized easily regardless of the size of the near-infrared reflector. Further, the utilization of the near-infrared reflective film enables to confirm the excellent near-infrared reflectivity.

The invention claimed is:

1. A near-infrared reflective film, comprising:
   a substrate; and
   multiple layers which are laminated on the substrate and are different in refractive index from each other, wherein a refractive index difference between at least two neighboring layers in the multiple layers is 0.3 or more, both of the two neighboring layers contain a metal oxide and a polyvinyl alcohol or an inorganic polymer, and wherein the metal oxide contained in a layer with a low refractive index of the two neighboring layers is a silicon dioxide.

2. The near-infrared reflective film described in claim 1, wherein the metal oxide contained in a layer with a high refractive index of the two neighboring layers is a titanium dioxide.

3. The near-infrared reflective film described in claim 1, wherein at least one of the two neighboring layers contains a hardening agent of the polyvinyl alcohol together with the polyvinyl alcohol.

4. The near-infrared reflective film described in claim 3, wherein the hardening agent is borate.

5. The near-infrared reflective film described in claim 1, wherein the polyvinyl alcohol has an average degree of polymerization being 1,000 to 5,000.

6. The near-infrared reflective film described in claim 1, wherein the polyvinyl alcohol has a degree of saponification being 70 to 100%.

7. The near-infrared reflective film described in claim 1, wherein the polyvinyl alcohol has an average degree of polymerization being 1,500 to 5,000.

8. The near-infrared reflective film described in claim 1, wherein the polyvinyl alcohol has a degree of saponification being 80 to 99.5%.

9. The near-infrared reflective film described in claim 1, wherein the two neighboring layers are located closest to the substrate among the multiple layers.

10. A near-infrared. reflector, comprising:
    a base plate; and
    the near-infrared reflective film described in claim 1 and disposed on at least one surface of the base plate.

11. An optical film, comprising:

a substrate; and multiple layers which are laminated on the substrate and are different in refractive index from each other, wherein a refractive index difference between at least two neighboring layers in the multiple layers is 0.3 or more, both of the two neighboring layers contain a metal oxide and a polyvinyl alcohol or an inorganic polymer, and wherein the metal oxide contained in a layer with a low refractive index of the two neighboring layers is a silicon dioxide.

12. The near infrared reflective film described in claim 1, wherein the two neighboring layers are obtained by coating coating compositions simultaneously on the substrate.

13. The near-infrared reflective film described in claim 1, having a visible light transmissivity of 50% or more and a region with reflectance of 50% or more for a wavelength region of 900 nm to 1400 nm.

14. The near-infrared reflective film described in claim 1, wherein the layer with the low refractive index comprises the polyvinyl alcohol.

\* \* \* \* \*